(12) United States Patent
Hsu

(10) Patent No.: US 10,674,199 B2
(45) Date of Patent: Jun. 2, 2020

(54) MEDIA CONTENT SELECTION FOR PASSENGERS

(71) Applicant: Otis Elevator Company, Farmington, CT (US)

(72) Inventor: Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 306 days.

(21) Appl. No.: 15/688,166

(22) Filed: Aug. 28, 2017

(65) Prior Publication Data
US 2019/0069019 A1   Feb. 28, 2019

(51) Int. Cl.
| | | |
|---|---|---|
| B66B 1/34 | (2006.01) | |
| H04N 21/43 | (2011.01) | |
| B66B 3/00 | (2006.01) | |
| H04N 21/472 | (2011.01) | |
| H04L 29/06 | (2006.01) | |

(52) U.S. Cl.
CPC ......... *H04N 21/4305* (2013.01); *B66B 3/008* (2013.01); *H04N 21/47202* (2013.01); *H04L 65/4084* (2013.01)

(58) Field of Classification Search
CPC .............. B66B 3/008; H04N 21/4305; H04N 21/47202; H04L 65/4084
USPC ....... 187/247, 277, 391, 392, 395, 396, 397; 706/910; 704/270, 276; 345/2.1, 2.2; 353/122; 340/815.4
See application file for complete search history.

(56) References Cited

U.S. PATENT DOCUMENTS

| | | | | |
|---|---|---|---|---|
| 4,852,696 A | * | 8/1989 | Fukuda ................ | B66B 3/00 187/392 |
| 4,995,479 A | * | 2/1991 | Fujiwara .............. | B66B 3/00 187/396 |
| 5,606,154 A | * | 2/1997 | Doigan ................ | B66B 3/00 187/393 |
| 5,844,181 A | * | 12/1998 | Amo .................... | B66B 1/34 187/396 |
| 5,955,710 A | * | 9/1999 | DiFranza ............. | B66B 1/34 187/247 |
| 6,076,638 A | * | 6/2000 | Gertz .................. | B66B 3/00 187/414 |
| 6,288,688 B1 | | 9/2001 | Hughes et al. | |

(Continued)

FOREIGN PATENT DOCUMENTS

| | | |
|---|---|---|
| JP | 08217348 A | 8/1996 |
| JP | 4212858 B2 | 1/2009 |

(Continued)

OTHER PUBLICATIONS

Extended Search Report for Application No. 18190226.3-1017, dated Jan. 4, 2019 8 pages.

*Primary Examiner* — Anthony J Salata
(74) *Attorney, Agent, or Firm* — Cantor Colburn LLP

(57) ABSTRACT

Embodiments include techniques for synchronizing media content for users, the techniques include receiving a request, and estimating a wait time based on a current position of a component and a destination of the component. The techniques also include selecting units of content to be provided to a user based at least in part on the estimated wait time, and providing a sequence of the selected units of content.

18 Claims, 4 Drawing Sheets

(56) References Cited

U.S. PATENT DOCUMENTS

| | | | |
|---|---|---|---|
| 6,315,083 B1 * | 11/2001 | Schuster | B66B 1/463 187/391 |
| 6,341,668 B1 * | 1/2002 | Fayette | B66B 3/00 187/247 |
| 6,349,797 B1 * | 2/2002 | Newville | B66B 1/34 187/391 |
| 6,381,626 B1 | 4/2002 | De Leo et al. | |
| 6,550,587 B1 * | 4/2003 | Yuasa | B66B 1/462 187/394 |
| 6,578,675 B2 * | 6/2003 | Wilson | B66B 3/008 187/247 |
| 6,615,175 B1 * | 9/2003 | Gazdzinski | B66B 1/34 187/396 |
| 6,866,125 B2 * | 3/2005 | Ball | B66B 23/24 187/391 |
| 6,962,240 B2 | 11/2005 | Difranza et al. | |
| 7,098,870 B2 | 8/2006 | Wampler et al. | |
| 7,156,211 B2 | 1/2007 | Difranza et al. | |
| 7,319,966 B2 * | 1/2008 | Friedli | B66B 3/00 187/388 |
| 7,319,968 B2 * | 1/2008 | Friedli | G06Q 10/20 187/388 |
| 7,552,801 B2 | 6/2009 | Trifu | |
| 8,869,947 B2 * | 10/2014 | Harkonen | G09F 21/00 187/295 |
| 2002/0036122 A1 | 3/2002 | Fayette et al. | |
| 2004/0227812 A1 | 11/2004 | Blair | |
| 2010/0217657 A1 | 8/2010 | Gazdzinski | |

FOREIGN PATENT DOCUMENTS

| | | |
|---|---|---|
| JP | 4712173 B2 | 6/2011 |
| JP | 5805459 B2 | 11/2015 |
| WO | 0143376 A1 | 6/2001 |
| WO | 0225624 A1 | 3/2002 |
| WO | 2012139048 A1 | 10/2012 |

* cited by examiner

MEDIA CONTENT SELECTION FOR PASSENGERS

BACKGROUND

The subject matter disclosed herein generally relates to elevators and, more particularly, to synchronizing media content for users.

In today's environment, buildings and vehicles are equipped with displays which can be used to inform and entertain those individuals who are in the vicinity. Buildings can use displays in areas including lobbies, hallways, staging areas, parking garages, airports, etc. Vehicles include elevators cars, automobiles, airport trams, lifts, carts, escalators, and/or other conveyance mechanisms. The areas and vehicles, equipped with displays, can be used to provide an opportunity to target messages to one or more passengers. The messages can be used to update the passengers with real-time news, status updates, advertisements, etc. In other scenarios, the displays can be used to simply entertain the passengers with trivia questions or jokes until a particular destination is reached. For example, the displays can be leveraged during an elevator ride to enhance the passenger's experience.

BRIEF DESCRIPTION

According to one or more embodiments, methods for synchronizing media content for users are provided. The method includes receiving, via a processor, a request, estimating a wait time based on a current position of a component and a destination of the component, selecting units of content to be provided to a user based at least in part on the estimated wait time, and providing a sequence of the selected units of content.

In addition to one or more of the features described herein, or as alternatives, further embodiments of the methods may include adjusting a length of at least one of the selected units of content based on a comparison of the estimated wait time and a duration of the sequence of the selected units of content.

In addition to one or more of the features described herein, or as alternatives, further embodiments of the methods may include adjusting a length of at least one selected unit of content, wherein the adjusting includes at least one of increasing a length of the selected unit of content based on a duration of the sequence not exceeding a threshold percentage of the estimated wait time or decreasing a length of the selected unit of content based on a duration of the sequence exceeding the estimated wait time.

In addition to one or more of the features described herein, or as alternatives, further embodiments of the methods may include an indication of remaining wait time is provided to the user with the sequence of the selected units of content, wherein the indication is a unit of time.

In addition to one or more of the features described herein, or as alternatives, further embodiments of the methods may include the units of content such as advertisements, news articles, jingles, trivia question and answer pairs, and other message types.

In addition to one or more of the features described herein, or as alternatives, further embodiments of the methods may include the component being at least one of an elevator car, transport car, escalator, conveyance mechanism, or waiting area.

In addition to one or more of the features described herein, or as alternatives, further embodiments of the methods may include triggering the request by one of an elevator call selection, an elevator floor selection, a card reader, closing of elevators doors, or starting an elevator run.

In addition to one or more of the features described herein, or as alternatives, further embodiments of the methods may include dynamically selecting a feature of the component based on the request.

In addition to one or more of the features described herein, or as alternatives, further embodiments of the methods may include a feature being at least one of a theme.

In addition to one or more of the features described herein, or as alternatives, further embodiments of the methods may include selecting units of content being based on at least one of a user profile, user preferences, or previously viewed content.

According to another embodiment, systems for synchronizing media content for users are provided. The systems include a storage medium, the storage medium being coupled to a processor and the processor configured to receive a request, estimate a wait time based on a current position of a component and a destination of the component, select units of content to be provided to a user based at least in part on the estimated wait time, and provide a sequence of the selected units of content.

In addition to one or more of the features described herein, or as alternatives, further embodiments of the systems may include the request being triggered by one of an elevator call selection, an elevator floor selection, a card reader, closing of elevator doors, or starting an elevator run.

In addition to one or more of the features described herein, or as alternatives, further embodiments of the systems may include adjusting a length of at least one selected unit of content based on a comparison of the estimated wait time and a duration of the sequence of the selected units of content.

In addition to one or more of the features described herein, or as alternatives, further embodiments of the systems may include adjust a length of at the selected unit of content, wherein the adjusting includes at least one of increasing a length of the selected unit of content based on a duration of the sequence not exceeding a threshold percentage of the estimated wait time or decreasing a length of the selected unit of content based on a duration of the sequence exceeding the estimated wait time.

In addition to one or more of the features described herein, or as alternatives, further embodiments of the systems may include an indication of remaining wait time is displayed with the sequence of the selected units of content, wherein the indication is a unit of time.

In addition to one or more of the features described herein, or as alternatives, further embodiments of the systems may include dynamically selecting a feature of the component based on the request.

In addition to one or more of the features described herein, or as alternatives, further embodiments of the systems may include a feature of the component is statically associated with a theme.

In addition to one or more of the features described herein, or as alternatives, further embodiments of the systems may include the component being at least one of an elevator car, transport car, escalator, conveyance mechanism, or waiting area.

In addition to one or more of the features described herein, or as alternatives, further embodiments of the systems may include the feature being at least one of a theme, wherein the theme is at least one of a sports theme, news themes, or trivia theme.

In addition to one or more of the features described herein, or as alternatives, further embodiments of the systems may include selecting units of content being based on at least one of a user profile, user preferences, or previously viewed content.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
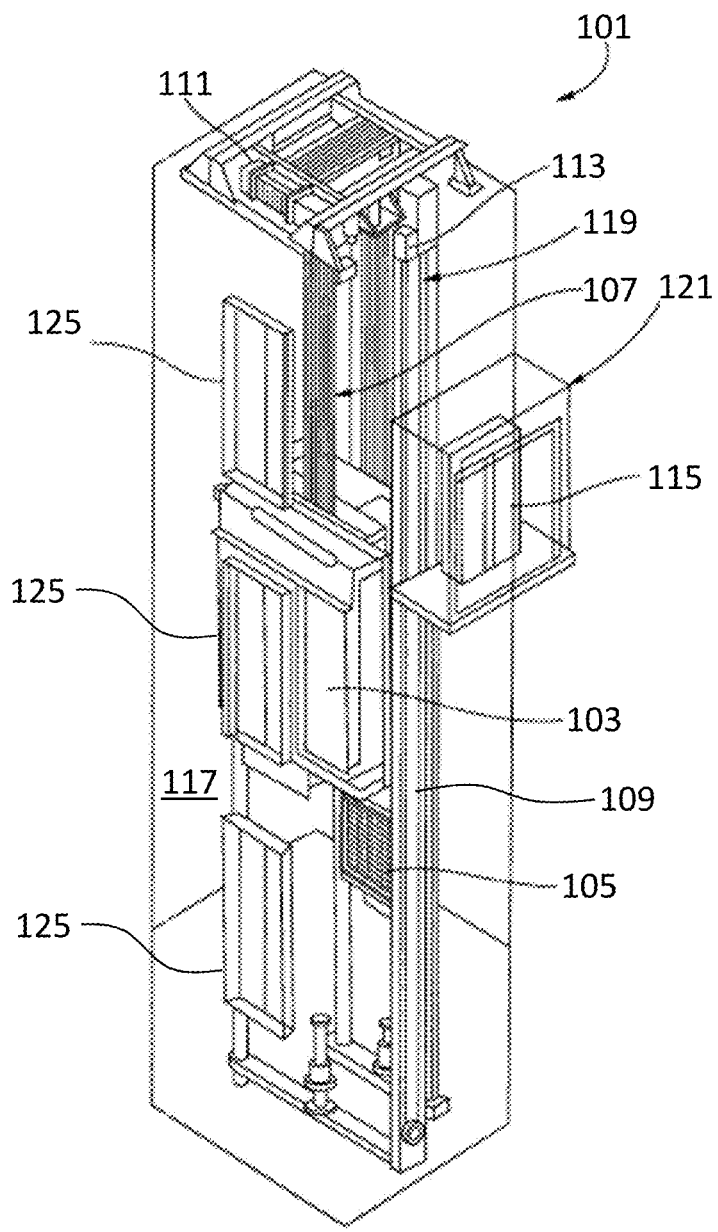
FIG. 1 is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and ropeless elevators, may employ embodiments of the present disclosure. FIG. 1 is merely a non-limiting example presented for illustrative and explanatory purposes.

Embodiments provided herein are direct to apparatuses, systems, and methods for fulfilling a request for service, such as a request for elevator service. In some embodiments, a request for elevator service may be communicated over one or more lines, connections, or networks, such as one or more cellular networks, WiFi, satellite, Bluetooth, near-field communication (NFC), e.g. a request made by a user device such as a smart phone. The request for service may be initiated by a mobile device controlled by and/or associated with a user, in a passive or active manner. In some embodiments, the mobile device may be operative in conjunction with a Transmission Control Protocol (TCP) and/or a User Datagram Protocol (UDP). In some embodiments, a request for service may be authenticated or validated based on a location of the mobile device. In some embodiments, a request for service may be fulfilled in accordance with one or more profiles, such as one or more user or mobile device profiles. In some embodiments the profiles may be registered as part of a registration process. In some embodiments, an elevator system may be registered with a service provider.

Figure 2:
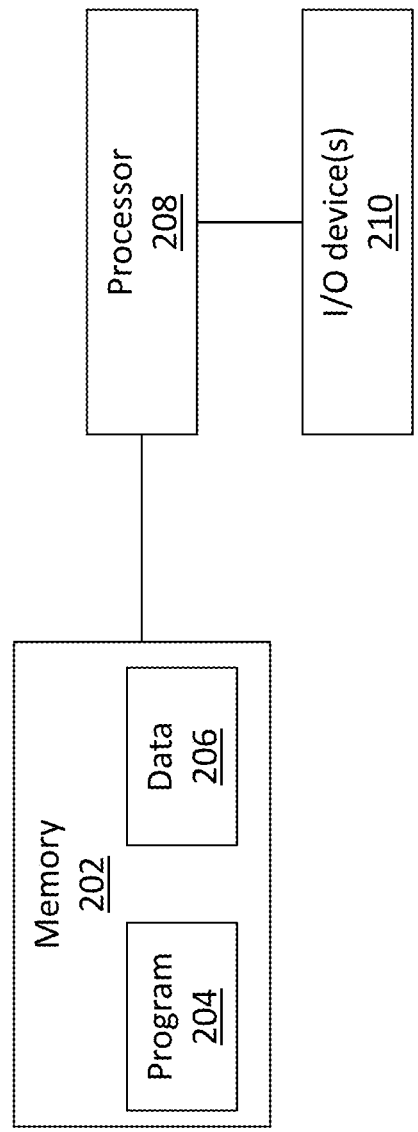
FIG. 2 is a schematic block diagram illustrating a computing system that may be configured in accordance with one or more embodiments of the present disclosure.

Referring now to FIG. 2, a computing system 200 is shown. The computing system 200 may be configured as part of and/or in communication with an elevator controller, e.g., controller 115 shown in FIG. 1. The system includes a memory 202 which may store executable instructions and/or data. The executable instructions may be stored or organized in any manner and at any level of abstraction, such as in connection with one or more applications, processes, routines, procedures, methods, etc. As an example, at least a portion of the instructions are shown in FIG. 2 as being associated with a program 204.

Further, as noted, the memory 202 may store data 206. The data 206 may include profile or registration data, elevator car data, a device identifier, or any other type(s) of data. The instructions stored in the memory 202 may be executed by one or more processors, such as a processor 208. The processor 208 may be operative on the data 206.

The processor 208 may be coupled to one or more input/output (I/O) devices 210. In some embodiments, the I/O device(s) 210 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 210 may be configured to provide an interface to allow a user to interact with the computing system 200. For example, the I/O device(s) may support a graphical user interface (GUI) and/or voice-to-text capabilities.

The components of the computing system 200 may be operably and/or communicably connected by one or more buses. The computing system 200 may further include other features or components as known in the art. For example, the computing system 200 may include one or more transceivers and/or devices configured to receive information or data from sources external to the computing system 200. For example, in some embodiments, the computing system 200 may be configured to receive information over a network (wired or wireless). The information received over a network may be stored in the memory 202 (e.g. as data 206) and/or may be processed and/or employed by one or more programs or applications (e.g., program 204).

The computing system 200 may be used to execute or perform embodiments and/or processes described herein. For example, the computing system 200, when configured as part of an elevator control system, may be used to receive commands and/or instructions, and may further be configured to control operation of and/or reservation of elevator cars within one or more elevator shafts.

It is becoming prevalent to provide video monitors at locations where a person is waiting for service fulfillment, such as in-elevator monitors or at gas station pumps. These monitors generally stream advertisements and/or news articles as the service is pending. Presently, the media content fails to provide an indication of the remaining time in the waiting period such as how long before a destination elevator floor will be reached or when some other service will be completed. In addition, there is no synchronization between the content and the time spent waiting. Users can become frustrated when they miss portions of the content such as the end of news story or the punchline of a joke.

The techniques described herein provide for synchronizing media content within a predicted waiting period. Not only is some of the boredom of waiting mitigated but the passengers receive some indication of the remaining waiting time. In addition, the media content is delivered in a fully cohesive manner which avoids providing the user with snippets and large periods of unused content space.

Figure 3:
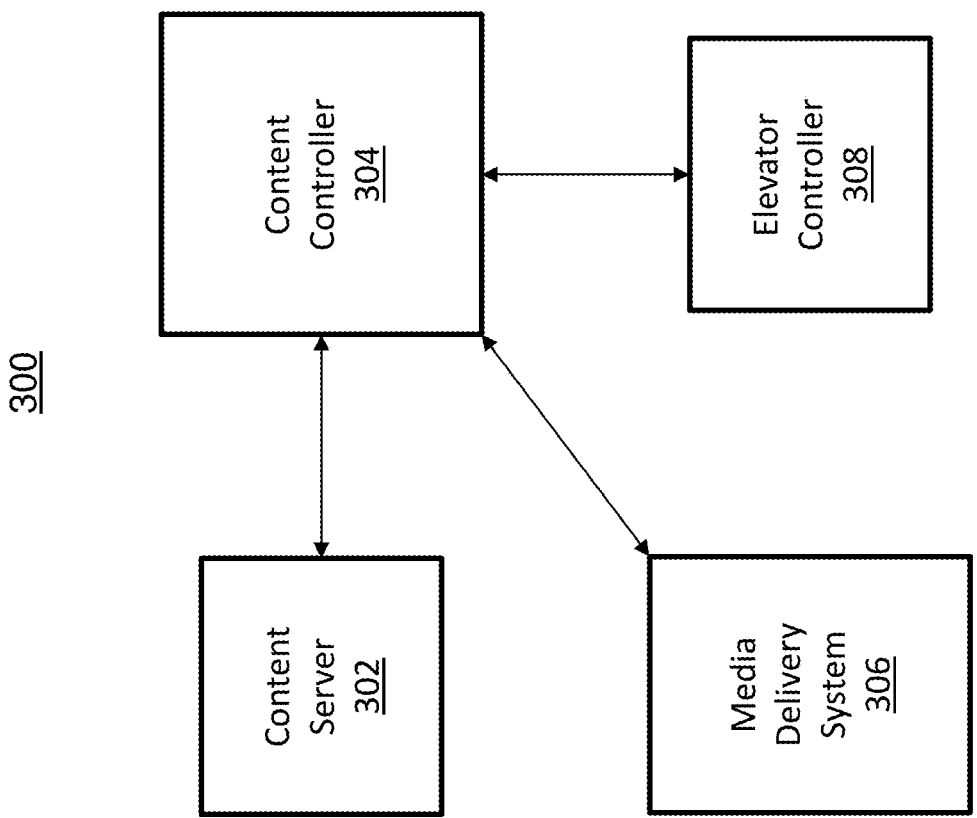
FIG. 3 is a schematic illustration of a system in accordance with an embodiment of the present disclosure.

Now referring to FIG. 3, a system 300 for synchronizing media content for users is provided. In one or more embodiments, the system 300 includes a content server 302. In one or more embodiments, the modules, components, and systems can be used in systems associated with conveyance mechanisms including cars, elevators, lifts, etc. In other embodiments, the system can be implemented to be used in combination with staging areas such as lobbies and landing areas.

In one or more embodiments, the content server 302 is configured with access to units of content. Non-limiting examples of the units of content can include news articles, a comedy sketch or joke, a trivia question and answer pair, an interesting factoid, a witty quotation, a music jingle, other messages, etc. Each piece of content is associated with a period of time. In one or more embodiments, a single piece of content can be flexible to fit into a certain period of time. For example, a trivia-question pair can take 8 seconds. However the same trivia-question pair can be modified and stretched to 12 seconds. In other embodiments, each piece of content can be associated with a fixed period of time. The content provided by the content server 302 can be displayed on a monitor located in the vicinity of the user or the content can be audio provided by speakers that are part of the media delivery system 306.

In one or more embodiments, as the content is stored in the content server 302, indicia of the duration of time corresponding to the length of each piece of content can be stored. In addition, other information can be stored along with the indicia for example, the type of content, the field associated with the content. This information can be used by the content controller 304 for performing content selection.

In one or more embodiments, the elevator controller 308 includes the supervisory control functions that monitor the position and motion disposition of the elevators. The elevator controller 308 also monitors the sequence of calls served prior to any particular stop. The information provided from the elevator controller 308 is used to determine the one or more units of content to be synchronized and displayed on the media delivery system 306. In one or more embodiments, the system 300 includes the media delivery system 306. The media delivery system 300 can include a monitor for displaying video and/or a speaker for providing audio in the elevators and/or queuing areas. In other embodiments, the elevator controller 308 can be a controller configured to control different types of systems.

In one or more embodiments, the content controller 304 selects one or more units of content stored in the content server 302 and determines the sequence for displaying the content. In one or more embodiments, the content controller 304 can connect to the network to dynamically obtain access to additional content to be provided in the system 300.

Figure 4:
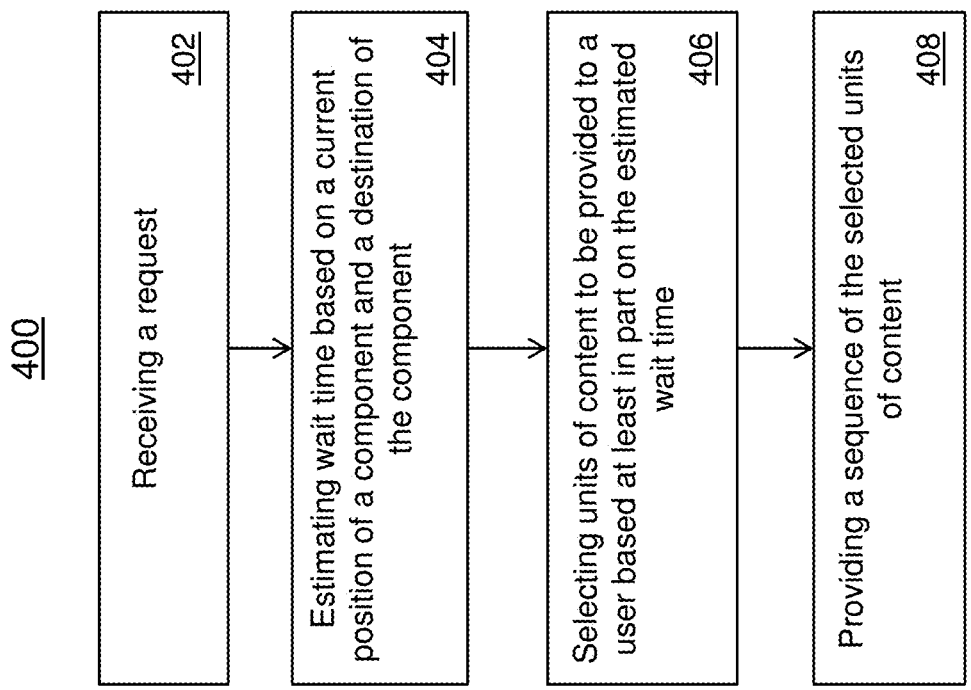
FIG. 4 illustrates a flow process for synchronizing media content for users in accordance with one or more embodiments of the present disclosure.

Now referring to FIG. 4, a method 400 for synchronizing media content for users is provided. Block 402 includes receiving a request. In one or more embodiments, the request is received by an elevator call button or a floor selection button. Other examples can include entering a lobby area of a building or boarding an airport tram leading to a terminal where a request is triggered by pressing a button, a key, a presence detection device, camera device, etc. In one or more embodiments, the request can be initiated by the system itself. For example, the request can be initiated when the doors of the elevator begin to close or when the doors are fully closed. In another example, the request can be initiated when the car beings to run towards its destination. The timing of the content can be synchronized to the behavior of the elevator and not necessarily when a user presses a button indicating an elevator call and/or destination floor.

Block 404 includes estimating a wait time based on a current position of a component and a destination of the component. In various embodiments, the component can be a conveyance mechanism or vehicle or other type of structure used to transport passengers and/or cargo. In a non-limiting example, the monitoring determines the location of an elevator car.

In one or more embodiments, the estimation can be triggered by the request. The wait time estimation determines the location of a component that is to provide service. For example, when an elevator call button is pressed, the monitoring of one of a plurality of elevators of an elevator bank can be triggered by the request. This particular example ensures that the user is in position of the elevator waiting for the arrival of elevator and can receive the content that will be displayed on the monitors. In different embodiments, the request can be triggered by other techniques and mechanisms.

The wait time can be estimated based at least in part on the position of the component. The position of the component can include the current position and the target destination of the component. In an example, the wait time can include the time it takes for the component to arrive so passengers can enter and/or exit a staging area or conveying mechanism. In one or more embodiments, the wait time is determined and/or estimated based on a current location of the component. One example can be an elevator passenger that has pressed an elevator call button to request an elevator. Referring to the above elevator call example, the wait time for an elevator from the 15$^{th}$ floor can be determined based on the amount of time it takes to reach an elevator call request from a passenger on the first floor. The estimation can include the number of stops the elevator must make on the way to service any other call requests. In another example, the wait time can include the amount of time it takes for a current passenger to reach their destination. Referring to the above example, the wait time can be the amount of time it takes an elevator passenger to reach the desired floor.

The wait time can be determined and/or estimated by the system using a timer that has tracked the previous durations. For example, the previous durations for an elevator to travel between each of the floors can be tracked. In a non-limiting example, an elevator having an express zone that skips floors 2-15 can determine and store the time it takes to travel the distance from the first floor to floor 16. In one or more embodiments, the system can optimize the travel times as time goes on by updating the stored travel times.

Block 406 includes selecting units of content to be provided to a user based at least in part on the estimated wait time. In an embodiment, the content can include audio-only content, video-only content, and/or a combination of audio and video. In one or more embodiments, one or more units of content can be selected to occupy the complete wait time. In an embodiment, the units of content are selected in a manner where each selected unit of content can be played in its entirety without being clipped or cut short. A threshold can be used to ensure that the wait time period is maximized. If the threshold is not met and/or the wait time is exceeded, the selected units of content can be modified.

Block 408 includes providing a sequence of the selected units of content. In an embodiment, the selected units of content are displayed on a monitor in an elevator lobby or other queuing area during the estimated time it takes for the elevator to arrive when called. In one or more embodiments, the selected units of content can be displayed on a monitor in the elevator itself or the audio can be provided audibly to a user over using speakers.

In one or more embodiments, one or more selected units of content can be modified. At least one unit of content can be modified based on the comparison of the determined wait time and a duration of the sequence of the selected units of content. For example, a length of at least one of the selected units of content is increased based on a duration of the sequence not exceeding a threshold percentage of the determined wait time. If the cumulative duration of the selected units of content fails to fill the majority of the wait time, such as a 95% threshold, one of the units of content can be extended to increase the utilization of the wait time. An 8 second message can be extended to 12 seconds by the system. After the unit of content is extended the cumulative duration can be checked again to determine if the threshold has been exceeded. If the threshold is not exceeded, another one of the units of content can be extended.

In one or more embodiments, the length of at least one of the selected units of content is decreased based on a duration for the sequence exceeding the determined wait time. For example, a unit of content such as an advertisement can trim its introduction to reduce the cumulative duration of the sequence. The substantive message of the advertisement is not trimmed but the music during the introduction can be shortened or eliminated. A re-check can be performed to ensure the estimated time period has not been exceeded and the duration is above a minimum threshold to ensure the determined wait time is being maximized.

The length of each of the selected units of content is cumulatively added up to obtain the length of time that is compared to the determined wait time. In the event there is not enough time between floors, a jingle or some static information can be displayed so that the users are not be provided with incomplete content. In one or more embodiments, each unit of content in the sequence is not repeated during a single trip.

In one or more embodiments, the types of content can be selected based on the direction of the elevator. For example, in the event the elevator is traveling down towards the lobby level information regarding traffic can be provided in the sequence of the selected units of content. In one or more embodiments, the types of content can also be based on the origin floor and/or destination floor. If the origin of the elevator is the lobby and traveling towards a different floor, a "welcome" message or other appropriate greeting can be provided. In another example, if a destination floor that is selected is a restaurant floor, the content can includes lunch and dinner specials or other menu selections available at the restaurant. If the destination floor is in a hotel and a destination floor includes a pool, gym, convention etc., units of content can be selected that are associated with the amenities available on the destination floor.

In one or more embodiments, an indication of remaining determined wait time is displayed with the sequence of the selected units of content, wherein the indication is a unit time. For example, in addition to showing the current floor information and while the sequence of units of content are being displayed, an indication in minutes and seconds of the time remaining to reach the destination can be provided to the user in the display or an audio indication.

In one or more embodiments, the units of content comprise advertisements, news articles, jingles, trivia question and answer pairs, sports information, and other message types.

In one or more embodiments, the request can be triggered by one of an elevator call selection, an elevator floor selection, or a card reader. For example, a request can provide information to the system of a current location of the user. The request can provide the floor the user is on and in which direction the user is headed. Additional information about a user can be provided by the credentials of a user's access card. For example, the access card can indicate the user's employer within an office building or the type of employer which can be used to target content towards the user. In one or more embodiments, selecting the units of content is based on knowledge of the preferences of waiting passengers. For example, passengers may scan access cards, fobs, or badges at a card reader or destination entry kiosk wherein the system can obtain preference information about the passengers. For example, in an office building if a passenger's credentials indicate they are employed with a sports agency, sports trivia content can be targeted towards those passengers.

In one or more embodiments, features of the elevator are dynamically selected based on the request received. For example, the theme of an elevator can be dynamically assigned based on the request, such as a sports theme or a trivia theme or a news theme. The request can be associated with a user's credentials or a floor selection. The theme can also include provide the audio in a particular accent. In another embodiment, each elevator can be statically associated with a theme which builds an association with those passengers that repetitively use the respective elevator.

In one or more embodiments, the same content is not repeated during a single trip. In another embodiment, the system can avoid providing the same content (e.g., trivia question) to a user who has been provided the same content recently.

In one or more embodiments, an elevator system has multiple queuing areas, where each elevator car comprises its own queuing area. Each landing area can comprise one or more queuing areas. In one or more embodiments, only a subset of the possible queuing areas is active in the sense that there are waiting passengers. In one or more embodiments, predetermined landing stops may be registered for an elevator or a group of elevators.

In one or more embodiments, the entrance to an elevator lobby, for example in an office building, includes a badge or access card reader. In a different configuration, a destination entry kiosk can be provided. The preference of each person can be stored on each person's access card and read into the system 300. The system 300 can use the information to target different content to the passengers based on the preferences. If multiple passengers arrive having different preferences, the preferences having the highest number of hits or in the case of a tie, the preferences of the first passenger to have their card read can be used in the content selection.

In another example, passengers using a destination entry system, can enter their destination at a kiosk and get assigned a particular elevator. In some configurations, each elevator car may not be equipped with floor selection buttons, therefore, the passengers must use the elevators to which they are assigned. In these systems, the passenger's credentials are associated with user profile and/or user preferences such as the user's employer information, interests, floor location, etc. The systems can register a call to the destination floor, and have their credentials linked to the particular destination. This information can be used to provide the passengers with content. The credentials can also be used to track the content that was previously provided to the user, where the system can use the information to ensure previous content is not repeated or repeated within in a configurable threshold of time.

In one or more embodiments, the modules, components, and/or elevators can take on features that provide a unique personality or theme. For example, elevator 1 can provide content in a particular accent and elevator 2 can be associated with sports trivia. This enhances the experience of each passenger by generating an association between a particular elevator and the passenger. Each elevator can be dynamically configured based on the detected preferences of the users or can be statically configured with a certain set of features. For example, elevator 5 can always be associated with sports trivia while elevator 1 is always associated with local news.

Aspects of the disclosure provide a reduction in the unpredictability of waiting time, the boredom of waiting, and the frustration of sound bits that are otherwise incomplete and incoherent. In one or more embodiments, the elevator as experienced by the users can be that of an intelligent elevator which ensures passengers are provided with complete messages and reduces the chances for incomplete messages. The intelligent elevator is also configured to select messages that are targeted according to the preferences of its passengers.

In addition, it provides users a more pleasant experience since they are provided with messages in their entirety instead of catching snippets of messages because they entered the elevator in the middle of the message or are exiting the elevator because they arrived at their destination prior to the completion of the message.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for synchronizing media content for users, the method comprising:
   receiving, via a processor, a request;
   estimating a wait time based on a current position of a component and a destination of the component;
   selecting units of content to be provided to a user based at least in part on the estimated wait time; and
   providing a sequence of the selected units of content, wherein a length of at least one of the selected units of content is adjusted to play its entirety based on a comparison of the estimated wait time and a duration of the sequence of the selected units of content.

2. The method of claim 1, wherein the adjusting includes at least one of increasing a length of the selected unit of content based on a duration of the sequence not exceeding a threshold percentage of the estimated wait time or decreasing a length of the selected unit of content based on a duration of the sequence exceeding the estimated wait time.

3. The method of claim 1, wherein an indication of remaining wait time is provided to the user with the sequence of the selected units of content, wherein the indication is a unit of time.

4. The method of claim 1, wherein the units of content comprises advertisements, news articles, jingles, trivia question and answer pairs, and other message types.

5. The method of claim 1, wherein the component is at least one of an elevator car, transport car, escalator, conveyance mechanism, or waiting area.

6. The method of claim 5, wherein the request is triggered by one of an elevator call selection, an elevator floor selection, a card reader, closing of elevator doors, or starting an elevator run.

7. The method of claim 5, wherein a feature of the component is dynamically selected based on the request.

8. The method of claim 7, wherein the feature is at least one of a theme.

9. The method of claim 1, wherein selecting units of content is based on at least one of a user profile, user preferences, or previously viewed content.

10. A system for synchronizing media content for users, the system comprising:
a storage medium, the storage medium being coupled to a processor;
the processor configured to:
receive a request;
estimate a wait time based on a current position of a component and a destination of the component;
select units of content to be provided to a user based at least in part on the estimated wait time; and
provide a sequence of the selected units of content, wherein a length of at least one of the selected units of content is adjusted to play its entirety based on a comparison of the estimated wait time and a duration of the sequence of the selected units of content.

11. The system of claim 10, wherein the request is triggered by one of an elevator call selection, an elevator floor selection, a card reader, closing of elevator doors, or starting an elevator run.

12. The system of claim 10, wherein the adjusting includes increasing a length of at the selected unit of content based on a duration of the sequence not exceeding a threshold percentage of the estimated wait time or decreasing a length of the selected unit of content based on a duration of the sequence exceeding the estimated wait time.

13. The system of claim 10, wherein an indication of remaining wait time is provided to the user with the sequence of the selected units of content, wherein the indication is a unit of time.

14. The system of claim 10, wherein a feature of the component is dynamically selected based on the request.

15. The system of claim 10, wherein a feature of the component is statically associated with a theme.

16. The system of claim 10, wherein the component is an elevator car, transport car, escalator, conveyance mechanism, or waiting area.

17. The system of claim 15, wherein the feature is at least one of a theme, wherein the theme is at least one of a sports theme, news themes, or trivia theme.

18. The system of claim 10, wherein selecting units of content is based on at least one of a user profile, user preferences, or previously viewed content.

* * * * *